(12) United States Patent
Ravichandran

(10) Patent No.: US 10,771,609 B2
(45) Date of Patent: Sep. 8, 2020

(54) MESSAGING TO EMERGENCY SERVICES VIA A MOBILE DEVICE IN A WIRELESS COMMUNICATION NETWORK

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/828,208

(22) Filed: Nov. 30, 2017

(65) Prior Publication Data
US 2019/0166244 A1    May 30, 2019

(51) Int. Cl.
| | | |
|---|---|---|
| H04M 11/04 | (2006.01) | |
| H04M 1/725 | (2006.01) | |
| H04L 29/06 | (2006.01) | |
| H04M 3/51 | (2006.01) | |
| H04L 12/58 | (2006.01) | |
| H04M 7/00 | (2006.01) | |

(52) U.S. Cl.
CPC ........ *H04M 1/72538* (2013.01); *H04L 51/20* (2013.01); *H04L 65/1069* (2013.01); *H04M 1/72541* (2013.01); *H04M 3/5116* (2013.01); *H04M 3/5191* (2013.01); *H04M 7/0045* (2013.01); *H04M 1/72572* (2013.01)

(58) Field of Classification Search
CPC ..... H04W 76/007; H04W 4/22; H04W 64/00; H04W 4/02; H04W 48/04; H04W 4/14; H04L 29/08108

USPC ........ 455/404.1–404.2, 414.1, 456.1–456.6, 455/466
See application file for complete search history.

(56) References Cited

U.S. PATENT DOCUMENTS

| | | | | |
|---|---|---|---|---|
| 9,374,465 | B1 * | 6/2016 | D'Penha | H04W 4/90 |
| 9,430,935 | B2 * | 8/2016 | Ginter | G08B 27/005 |
| 2007/0015489 | A1 * | 1/2007 | Jennings | H04W 4/02 455/404.2 |
| 2009/0156237 | A1 * | 6/2009 | Hwang | H04M 3/42357 455/466 |
| 2010/0002846 | A1 * | 1/2010 | Ray | G10L 13/043 379/37 |
| 2012/0302217 | A1 * | 11/2012 | Sennett | H04W 4/22 455/414.1 |
| 2014/0122876 | A1 * | 5/2014 | Johnson | H04L 69/14 713/168 |
| 2017/0310802 | A1 * | 10/2017 | Pitts | H04W 4/90 |

* cited by examiner

*Primary Examiner* — Matthew W Genack
(74) *Attorney, Agent, or Firm* — Lee & Hayes, P.C.

(57) ABSTRACT

A method of requesting emergency services via an emergency services request application executing on a mobile device operating in a wireless communication network. The method includes determining, by the application, a location of the mobile device. Based at least in part on the location, the wireless communication network determines a Public Safety Answering Point (PSAP)/emergency service responder to contact. The application then attempts to initiate a chat session with the PSAP to request emergency services. The application next receives a response to initiating the chat session from the PSAP. The response may be some type of acknowledgement from the PSAP of a successful initiation of the chat session or may be a bounce-back message indicating an unsuccessful initiation of the chat session.

20 Claims, 5 Drawing Sheets

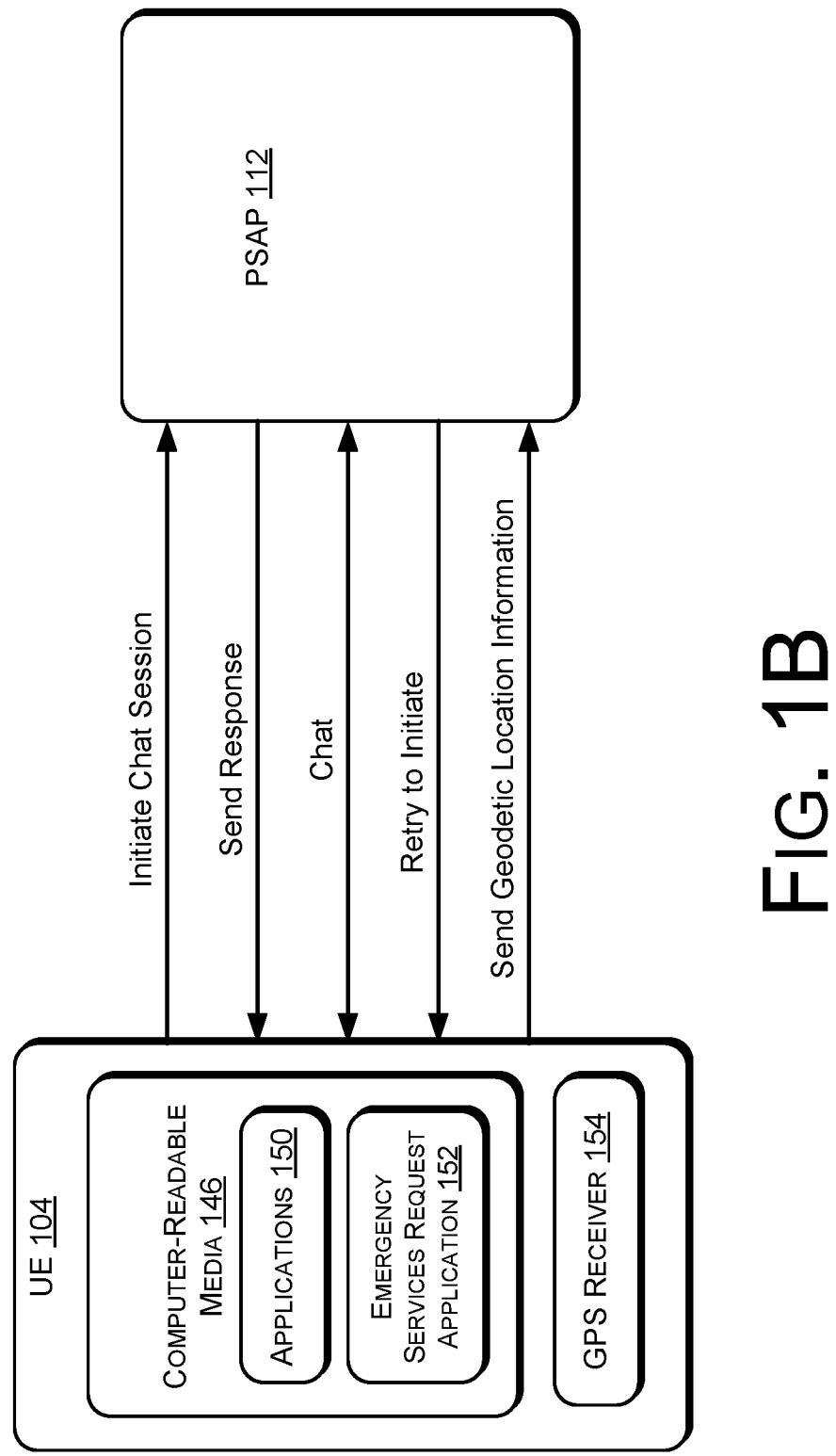

MESSAGING TO EMERGENCY SERVICES VIA A MOBILE DEVICE IN A WIRELESS COMMUNICATION NETWORK

BACKGROUND

In recent years, mobile telecommunication devices have advanced from offering simple voice calling services within wireless networks to providing users with many new features. Mobile telecommunication devices now provide messaging services such as email, text messaging, and instant messaging; data services such as Internet browsing; media services such as storing and playing a library of favorite songs; location services; and many others. In addition to the new features provided by the mobile telecommunication devices, users of such mobile telecommunication devices have greatly increased. Such an increase in users is only expected to continue and in fact, it is expected that there could be a growth rate of twenty times more users in the next few years alone.

Mobile devices are especially useful in emergency situations for requesting emergency services. However, sometimes it is not possible for a user, in an emergency situation, to speak on the mobile device. Thus, in such situations, it can be difficult for the user to obtain needed emergency services in a timely fashion.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 1A and 1B schematically illustrate a wireless communication network, in accordance with various embodiments.

DETAILED DESCRIPTION

Figure 1A:
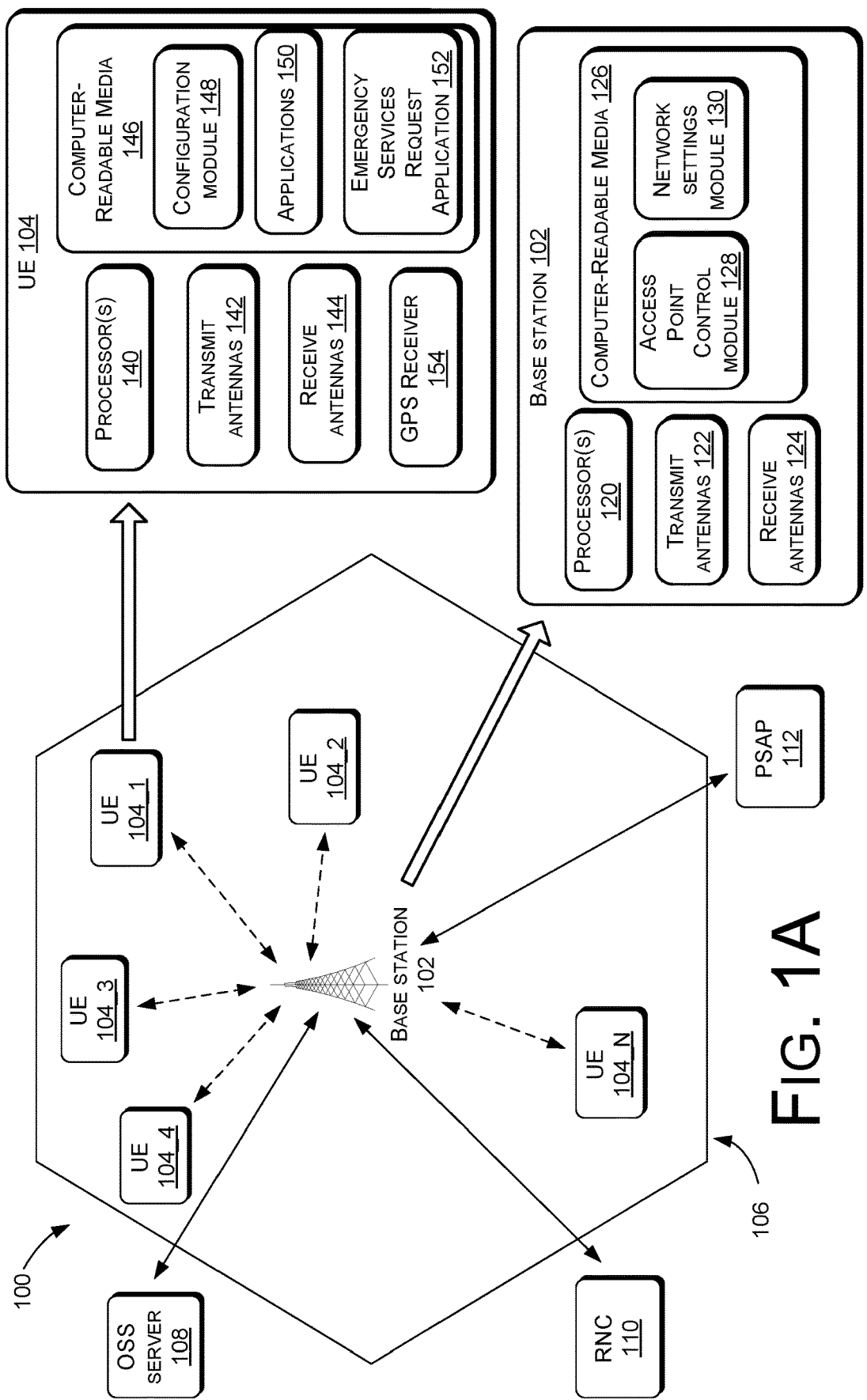

Described herein is a wireless communication network and mobile devices for use in the wireless communication network that include techniques and architecture for contacting emergency services providers via a "chat" session (Session mode) using a mobile device. For example, a user's mobile device may include an emergency services request application that may be used to initiate a chat session with an emergency services provider. This can allow the user to communicate with the emergency services provider via the wireless communication network in emergency situations even if the user is unable to speak (or does not wish to speak).

More particularly, in configurations, when a user of a mobile device requires emergency services and is unable to speak (or does not wish to speak), the user may use their mobile device to contact emergency service providers for emergency services by initiating a chat session with the emergency services provider. For example, a user may execute an emergency services request application located on the user's mobile device to initiate a chat session. The user, using the emergency services request application, may initiate a chat session with a public safety answering point ("PSAP") or emergency service responder. As is known, a PSAP generally is a call center responsible for answering calls to an emergency telephone number for police, firefighting and ambulance services. Trained telephone operators are usually responsible for dispatching these emergency service. In accordance with a configuration, the chat session may be initiated by forwarding a packet that includes a custom header to distinguish that it is a messaging service that is being utilized to contact the PSAP.

Based upon execution of the emergency services request application, the mobile device may determine its current location using any of a variety techniques, including, but not limited to, utilizing a GPS function of GPS receiver, utilizing a Cell Global Identity ("CGI"), a third party application that may have determined a position of the mobile device utilizing a GPS function of the GPS receiver, cell tower triangulation, etc. In configurations, the mobile device may have already determined a current location of the mobile device for some purpose and may thus use the previously determined current location. When contacting the wireless communication network to initiate the chat session, based upon the location of the mobile device, the wireless communication network may determine which PSAP in the wireless communication network to contact.

If the initiation of the chat session is successful, in configurations the PSAP may provide an acknowledgement message acknowledging successful initiation of the chat session in the chat session to the user. For example, the PSAP may identify themselves and/or ask what the emergency is, what type of emergency services are needed/being requested, etc. The user may then respond appropriately to the PSAP and the chat session may proceed as if the user were speaking with an operator at the PSAP.

If the attempt to initiate the chat session with the PSAP is unsuccessful, the PSAP may send a "bounce-back" message to the mobile device of the user indicating that the attempt failed. The bounce-back message from the PSAP may cause the emergency service request application to illustrate a pre-configured message to the user that the attempt to initiate the chat session failed, that the user should call the PSAP (e.g., 911), or the like. Since the user may still be unable to speak (or may still not wish to speak), the user may simply continue to attempt to initiate a chat session with the PSAP until a chat session is successfully established. In configurations, a local bounce-back message may be provided by the wireless communication network when, for example, initiation of the chat session failed due to network issues, WiFi is down, Internet service is down, etc. A remote bounce-back message may be provided by the PSAP when, for example, the PSAP is unable to handle chat sessions with mobile devices.

In a configuration, the mobile device of the user may also send geodetic location information (or other location information indicating a current location) to the PSAP to help identify the user's location. The sending of the geodetic location information may occur while the user is initiating the chat session with the PSAP or during the established chat session.

FIG. 1A illustrates a wireless communication network 100 (also referred to herein as network 100). The network 100 comprises a base station (BS) 102 communicatively coupled to a plurality of user devices, referred to as UEs 104_1, 104_2, . . . , 104_N, where N is an appropriate integer. The BS 102 serves UEs 104 located within a geographical area, e.g., within a macro cell 106. FIG. 1A illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and thus, the wireless communication network 100 may be divided into four regional subnetworks, where each regional subnetwork includes multiple macro cells 106 that may be divided into small cells.

In an embodiment, the UEs 104_1, . . . , 104_N may comprise any appropriate devices, e.g., portable electronic devices, for communicating over a wireless communication network. Such devices include mobile telephones, cellular telephones, mobile computers, Personal Digital Assistants (PDAs), radio frequency devices, handheld computers, laptop computers, tablet computers, palmtops, pagers, devices configured as IoT devices, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1A) to a number of backhaul equipments, e.g., an operation support subsystem (OSS) server 108, a radio network controller (RNC) 110, and/or the like. The RNC 110 can also be in the form of a mobility management entity that serves as a gateway when the wireless communication network 100 operates according to the long term evolution (LTE) standard or LTE Advanced standard.

The BS 102 may also be communicatively coupled to a public safety answering point (PSAP)/emergency service responder 112 (referred to herein as PSAP 112). As is known, a PSAP generally is a call center responsible for answering calls to an emergency telephone number for police, firefighting and ambulance services. Trained telephone operators are usually responsible for dispatching these emergency service. The PSAP 112 is configured to receive communications from UEs 104 (e.g., 911 calls), where a user of a UE 104 is requesting emergency services, e.g., ambulance services, police services, firefighting services, etc.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1A illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1A, various other modules (e.g., an operating system module, basic input/output systems (BIOS), etc.) may also be stored in the computer-readable media 126. Furthermore, although not illustrated in FIG. 1A, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146 in the form of memory and/or cache. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processors 140. For instance, the computer-readable media 140 may store a configuration module 148. In configurations, the computer-readable media 146 may also store one or more applications 150 configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.). In a configuration, the computer-readable media 146 may store an emergency services request application 152, as will be described further herein. The applications 150 may also include third-party applications that provide additional functionality to the UE 104. In configurations, the UE 104 may also comprise a Global Positioning System (GPS) receiver 154 and/or another location determination component.

Although not illustrated in FIG. 1A, the UEs 104 may also comprise various other components, e.g., a battery, a charging unit, one or more network interfaces, an audio interface, a display, a keypad or keyboard, and other input and/or output interfaces.

Although FIG. 1A illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 13 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

In configurations, when a user of a UE 104 requires emergency services and is unable to speak (or does not wish to speak), the user may use the UE 104 to contact emergency service providers for emergency services by initiating a chat session (Session mode) with the emergency services provider. For example, the user may execute the emergency services request application 152 on the UE 104 to initiate a chat session. For example, the user may initiate a chat session with the PSAP 112. In accordance with a configuration, the chat session may be initiated by forwarding a packet that includes a custom header to distinguish that it is a messaging service that is being utilized to contact the PSAP 112. For example, the header may include "urn:service:sos.messaging" to distinguish that the packet is directed to a messaging service. In a configuration, the chat session operates in accordance with Session Initiation Protocol (SIP) and Message Session Relay Protocol (MSRP) as the core protocols for communication.

Based upon execution of the emergency services request application 152, the UE 104 may determine its current location using any of a variety techniques, including, but not limited to, utilizing a GPS function of the GPS receiver 154, utilizing a CGI, a third party application 150 that may have determined a position of the UE 104 utilizing a GPS function of the GPS receiver 154, cell tower triangulation, etc. In configurations, the UE 104 may have already determined a current location of the UE 104 for some purpose and may thus use the previously determined current location.

When contacting the wireless communication network 100 to initiate the chat session, based upon the location of the UE 104, the wireless communication network 100 may determine which PSAP 112 in the wireless communication network 100 with which to initiate the chat session since there are generally multiple PSAPs 112 in the wireless communication network 100. When initiating the chat session, the UE 104 provides a at least a latitude and a longitude for the current location of the UE 104 to the wireless communication network, which can be used to help determine which PSAP 112 to contact. In configurations, the emergency services request application 152 may determine which PSAP 112 to contact based at least in part on the location of the UE 104.

In a configuration, the emergency services request application 152 may also send the current location of the UE 104 in the form of geodetic location information (or other location information indicating the current location of the UE 104) to the PSAP 112 to help identify the location of the user. The sending of the geodetic location information may occur while the user is initiating the chat session with the PSAP 112 or during an established chat session.

If the initiation of the chat session is successful, in configurations the PSAP 112 may provide an acknowledgement message acknowledging successful initiation of the chat session in the chat session to the UE 104. For example, the PSAP 112 may identify itself, ask what the emergency is, what type of emergency services are needed/being requested, and/or the like. The user may then correspondingly respond with the UE 104 to the PSAP 112 and the chat session may proceed as if the user were speaking with an operator at the PSAP 112. In a configuration, the chat session may only be terminated by the PSAP 112.

If the attempt to initiate the chat session with the PSAP 112 is unsuccessful (or a successful chat session is ended due to error, network problems, etc.), the PSAP 112 may send a "bounce-back" message to the UE 104 of the user indicating that the attempt failed. The bounce-back message from the PSAP 112 may cause the emergency service request application 152 to display a pre-configured message on the UE 104 to the user that the attempt to initiate the chat session failed, that the user should call the PSAP (e.g., 911), or the like. Since the user may still be unable to speak (or may still not wish to speak), the user may simply continue to attempt to initiate a chat session with the PSAP 112 until a chat session is successfully established. In a configuration, the emergency service request application 152 may cause the UE 104 to provide the pre-configured message audibly to the user, either in addition to or instead of the displayed pre-configured message. In configurations, a local bounce-back message may be provided by the wireless communication network 100 when, for example, initiation of the chat session failed due to network issues, WiFi is down, Internet service is down, etc. A remote bounce-back message may be provided by the PSAP 112 when, for example, the PSAP 112 is unable to handle chat sessions with UEs 104.

In a configuration, one or more files may be forwarded from the UE 104 to the PSAP 112. For example, one or more pictures, audio recordings, video recordings (with or without audio), etc., may be sent by the UE 104 to the PSAP 112.

FIG. 1B schematically illustrates an arrangement of a UE 104 interacting with the PSAP 112 of the wireless communication network 100 of FIG. 1A. The UE 104 generally includes many of the previously mentioned components and/or features. However, for simplicity, the UE 104 is only illustrated as including applications 150 and the location application 152 located in the computer-readable media 146 and the GPS receiver 154.

With reference to FIG. 1B, as previously discussed, the emergency service request application 152 may attempt to initiate a chat session with a PSAP 112 via the wireless communication network 100. The PSAP 112 may send back a response to the UE 104. The response may be that the chat session has been successfully initiated. Thus, the acknowledgement may be a message in a chat session confirming one or more of the chat session having been successfully established with the PSAP 112, a request as to what the emergency is, what emergency service(s) are being requested, and the like. The chat session may continue until the PSAP 112 ends the chat session. This may occur prior to emergency services arriving to help the user of the UE 104 or may occur when the services arrive. In a configuration, only the PSAP 112 may terminate the chat session.

In accordance with a configuration, as previously noted, the UE 104 may send geodetic location information (or other location information indicating the current location of the UE 104) to the PSAP 112. The geodetic information may be sent to the PSAP 112 while attempting to initiate the chat session. In another configuration, the geodetic location information may be sent from the UE 104 to the PSAP 112 during the chat session.

If the chat session is not successfully initiated, then the PSAP 112 may send back a response in the form of a bounce-back message to the UE 104. Upon receiving the bounce-back message indicating that the chat session initiation was not successful, the emergency services request application 152 may display a message to the user of the UE 104. The message may be a preconfigured message and may indicate that the user should call the PSAP 112 (e.g., 911), and/or attempt to initiate a chat session again. As previously noted, in a configuration, the emergency service request application 152 may cause the UE 104 to provide the pre-configured message audibly to the user, either in addition to or instead of the displayed message. In response to the bounce-back message, the user may retry to attempt to initiate a chat session with the PSAP 112 via the emergency service request application 152.

Thus, by utilizing the emergency service request application 152 on the UE 104, emergency services may be requested by a user when the user is unable to speak or does not wish to speak. This can allow for timely provision of emergency services to the user in emergency situations.

Figure 2:
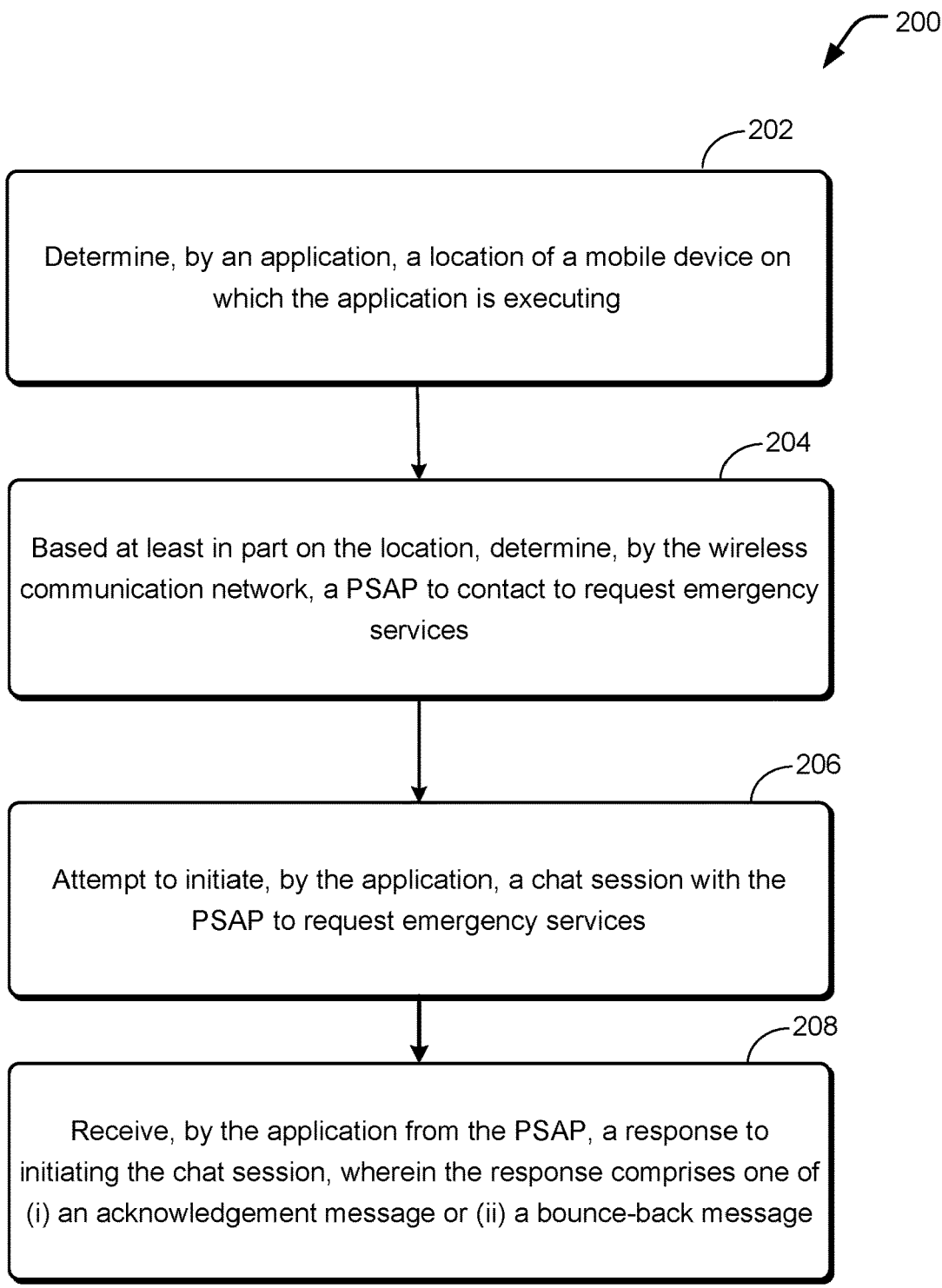
FIG. 2 is a flowchart illustrating a method of requesting emergency services via an emergency services request application executing on a portable electronic device operating in the wireless communication network of FIGS. 1A and 1B, in accordance with various embodiments.

FIG. 2 is a flow diagram of an illustrative process that may be implemented within the wireless communication network 100. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 2 is a flowchart illustrating a method 200 of requesting emergency services via an application, e.g., emergency services request application 152, executing on a mobile device, e.g., UE 104, operating in a wireless communication network, e.g., wireless communication network 100. As illustrated, at block 202, the application determines a location of the mobile device. At block 204, based at least in part on the location, the wireless communication network determines a PSAP, e.g., PSAP 112, to contact. At block 206, the application initiates a chat session with the PSAP to request emergency services. At block 208, the application receives a response, from the PSAP, to initiating the chat session, wherein the response comprises one of (i) an acknowledgement message or (ii) a bounce-back message.

Figure 3:
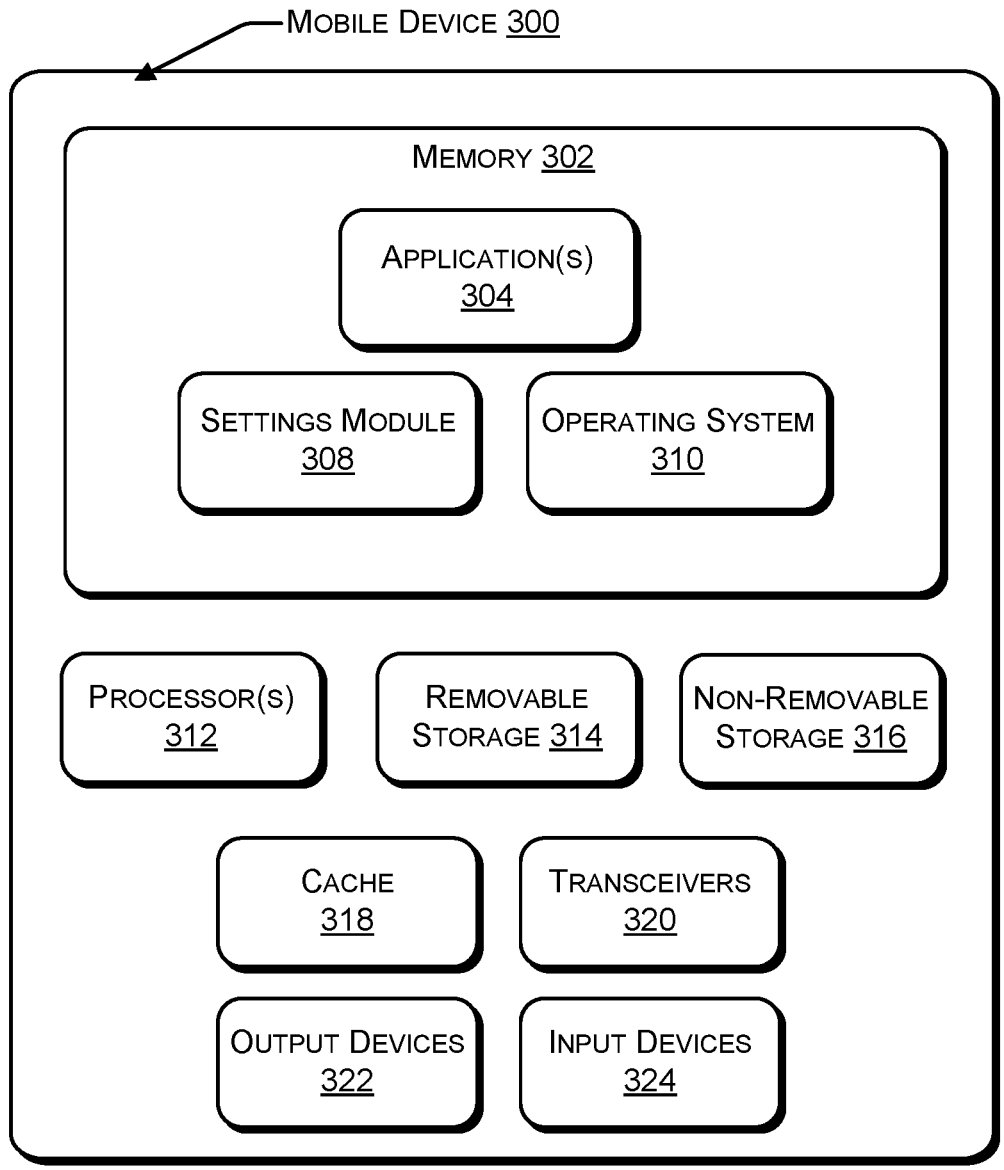
FIG. 3 schematically illustrates a component level view of an example mobile device configured for use in the wireless communication networks of FIGS. 1A and 1B.

FIG. 3 schematically illustrates a component level view of a mobile device 300, such as UE 104, configured to function within wireless communication network 100. As illustrated, the mobile device 300 comprises a system memory 302, e.g. computer-readable media 146, storing application(s) 304, e.g., applications 150 and emergency services request application 152, a settings module 308, and an operating system 310. Also, the mobile device 300 includes processor(s) 312, a removable storage 314, a non-removable storage 316, transceivers 318, output device(s) 320, and input device(s) 322. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316. Additionally, the mobile device 300 includes cache 318, such as cache 156, for storing one or more locations of the mobile device 300.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 300. Any such non-transitory computer-readable media may be part of the user device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna. Also or instead, the transceivers 320 may include wireless modem(s) to may facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the mobile device 300 to define how the user wishes certain calls from third parties to be handled by the wireless communication network, as previously described herein.

Figure 4:
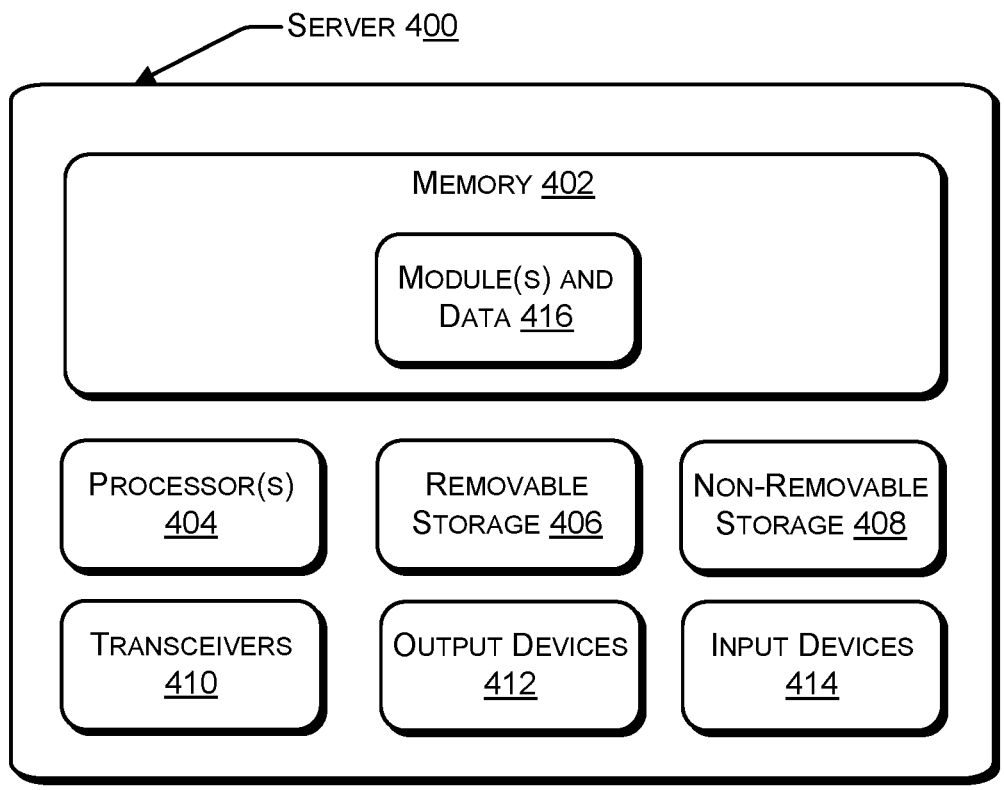
FIG. 4 schematically illustrates a component level view of a server configured for use in the arrangements of FIGS. 1A and 1B to provide various services of the wireless communication network of FIGS. 1A and 1B.

FIG. 4 illustrates a component level view of a server configured for use within a wireless communication network, e.g., wireless communication network 100 in order to provide various services within the wireless communication network, according to the techniques described herein. The server 400 may serve as the OSS server 108 or may be located in the RNC or gateway 110. Additionally, the server 400 may be located in the PSAP 112. As illustrated, the server 400 comprises a system memory 402 that may store data and one or more modules and/or applications 416 for interacting with mobile devices 300, e.g., UEs 104, as described herein. Also, the server 400 includes processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.) or some combination of the two. In some implementations, the processor(s) 404 is a central processing unit (CPU), a graphics processing unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processors 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also or instead, the transceivers 410 may include wireless modem(s) to may facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method of requesting emergency services, the method comprising:
    executing, in response to user input provided to a mobile device of a user to request emergency services at a location of the mobile device, an emergency services request application on the mobile device;
    attempting, by the emergency services request application, to initiate a chat session with a public safety answering point (PSAP) that, upon a successful initiation, continues between the emergency services request application executing on the mobile device and the PSAP until the chat session is terminated by the PSAP;
    determining, by the emergency services request application, the location of the mobile device;
    sending, by the emergency services request application to a wireless communication network, the location of the mobile device;
    sending, by the emergency services request application to the wireless communication network, a packet that includes a header that distinguishes that a messaging service is being used to contact the PSAP; and
    receiving, by the emergency services request application from a particular PSAP selected based at least in part on the location of the mobile device, a response comprising one of (i) an acknowledgement message indicating the successful initiation of the chat session or (ii) a bounce-back message indicating that the attempt to initiate the chat session failed.

2. The method of claim 1, wherein the method further comprises:
    based upon receipt of the bounce-back message, displaying, with the emergency services request application, a message to the user of the mobile device that indicates that the user should call an emergency number.

3. The method of claim 1, wherein the response comprises the acknowledgement message and the acknowledgement message requests information from the user of the mobile device with respect to a reason for initiating the chat session.

4. The method of claim 1, further comprising:
    providing, by the emergency services request application, location information to the particular PSAP.

5. The method of claim 1, further comprising:
    forwarding, by the emergency services request application, one or more files to the particular PSAP.

6. The method of claim 5, wherein forwarding the one or more files to the particular PSAP comprises:
    forwarding at least one of (i) a picture, (ii) an audio recording or (iii) a video.

7. The method of claim 1, wherein the chat session operates between the emergency services request application and the PSAP based on Session Initiation Protocol (SIP) and Message Session Relay Protocol (MSRP) protocols.

8. A mobile device comprising:
    one or more processors;
    a non-transitory storage medium; and
    instructions stored in the non-transitory storage medium, the instructions being executable by the one or more processors to:
        execute, in response to user input provided to request emergency services at a location of the mobile device, an emergency services request application on the mobile device;
        attempt, by the emergency services request application, to initiate a chat session with a public safety answering point (PSAP) that, upon a successful initiation, continues between the emergency services request application executing on the mobile device and the PSAP until the chat session is terminated by the PSAP;
        determine, by the emergency services request application, the location of the mobile device;
        send, by the emergency services request application to a wireless communication network, the location of the mobile device;
        send, by the emergency services request application to the wireless communication network, a packet that includes a header that distinguishes that a messaging service is being used to contact the PSAP; and
        receive, by the emergency services request application from a particular PSAP selected based at least in part on the location of the mobile device, a response comprising one of (i) an acknowledgement message indicating the successful initiation of the chat session or (ii) a bounce-back message indicating that the attempt to initiate the chat session failed.

9. The mobile device of claim 8, wherein the instructions are further executable by the one or more processors to:
    based upon receipt of the bounce-back message, display, by the emergency services request application, a message to a user of the mobile device that indicates that the user should call an emergency number.

10. The mobile device of claim 8, wherein the response comprises the acknowledgement message and the acknowledgement message requests information from a user of the mobile device with respect to a reason for initiating the chat session.

11. The mobile device of claim 8, wherein the instructions are further executable by the one or more processors to:
provide, by the emergency services request application, location information to the particular PSAP.

12. The mobile device of claim 8, wherein the instructions are further executable by the one or more processors to:
forward, by the emergency services request application, one or more files to the particular PSAP.

13. The mobile device of claim 12, wherein the one or more files comprise at least one of (i) a picture, (ii) an audio recording or (iii) a video.

14. The mobile device of claim 8, wherein the chat session operates between the emergency services request application and the PSAP based on Session Initiation Protocol (SIP) and Message Session Relay Protocol (MSRP) protocols.

15. A non-transitory storage medium comprising instructions stored thereon, the instructions being executable by one or more processors of a mobile device to:
execute, in response to user input provided to the mobile device to request emergency services at a location of the mobile device, an emergency services request application on the mobile device;
attempt, by the emergency services request application, to initiate a chat session with a public safety answering point (PSAP) that, upon a successful initiation, continues between the emergency services request application executing on the mobile device and the PSAP until the chat session is terminated by the PSAP;
determine, by the emergency services request application, the location of the mobile device;
send, by the emergency services request application to a wireless communication network, the location of the mobile device;
send, by the emergency services request application to the wireless communication network, a packet that includes a header that distinguishes that a messaging service is being used to contact the PSAP; and
receive, by the emergency services request application from a particular PSAP selected based at least in part on the location of the mobile device, a response comprising one of (i) an acknowledgement message indicating the successful initiation of the chat session or (ii) a bounce-back message indicating that the attempt to initiate the chat session failed.

16. The non-transitory storage medium of claim 15, wherein the instructions are further executable by the one or more processors to:
provide, by the emergency services request application, location information to the particular PSAP.

17. The non-transitory storage medium of claim 15, wherein the instructions are further executable by the one or more processors to:
forward, by the emergency services request application, one or more files to the particular PSAP.

18. The non-transitory storage medium of claim 17, wherein the one or more files comprise at least one of (i) a picture, (ii) an audio recording or (iii) a video.

19. The non-transitory storage medium of claim 15, wherein the response comprises the bounce-back message and wherein the instructions are further executable by the one or more processors to:
based upon receipt of the bounce-back message, display, by the emergency services request application, a message to a user of the mobile device that indicates that the user should call an emergency number.

20. The non-transitory storage medium of claim 15, wherein the response comprises the acknowledgement message and the acknowledgement message requests information from a user of the mobile device with respect to a reason for initiating the chat session.

* * * * *